United States Patent [19]

Lardner et al.

[11] Patent Number: 4,776,369

[45] Date of Patent: Oct. 11, 1988

[54] CHECK VALVE HAVING SNAP-ON CLAMPING SLEEVE

[75] Inventors: George E. Lardner, Seminole; Glenn Mackal, St. Petersburg, both of Fla.

[73] Assignee: Halkey-Roberts Corporation, St. Petersburg, Fla.

[21] Appl. No.: 17,624

[22] Filed: Feb. 24, 1987

[51] Int. Cl.⁴ .................. F16K 15/14; F16L 33/22
[52] U.S. Cl. .................. 137/515.5; 137/515; 137/843; 137/798; 251/152; 285/242
[58] Field of Search .............. 137/515, 515.5, 798, 137/843; 251/152; 285/242, 255, 260

[56] References Cited

U.S. PATENT DOCUMENTS

| | | | |
|---|---|---|---|
| 3,142,502 | 7/1964 | Luther | 285/242 |
| 3,182,682 | 5/1965 | Gilliam | 137/515.5 |
| 3,222,091 | 12/1965 | Marshall | 285/255 X |
| 3,495,855 | 2/1970 | Currie et al. | 285/259 X |
| 3,590,851 | 7/1971 | Bogossian et al. | 137/515 X |
| 3,711,131 | 1/1973 | Evans | 285/259 |
| 3,831,629 | 8/1974 | Mackal et al. | 137/843 |
| 3,860,268 | 1/1975 | Zeman | 285/242 X |

FOREIGN PATENT DOCUMENTS 2076123 11/1981 United Kingdom ............ 137/515.5
2178811 2/1987 United Kingdom .

Primary Examiner—John Rivell
Attorney, Agent, or Firm—Dominik, Stein, Saccocio & Reese

[57] ABSTRACT

A snap-on valve sleeve for a check valve designed to be rigidly and sealingly secured within the end of an elastomeric tube. The sleeve includes a plurality of inwardly disposed barb segments positioned in mating alignment with an annular protrusion positioned about the outer surface of the valve body. The annular protrusion comprises an upward rearwardly sloped surface and a flat step surface perpendicular to the outer surface of the valve body. The check valve is inserted into the end of the tube. The outer edge of the end of the tube slides over the step surface positioning the tube along a partial length of the valve body. The sleeve is positioned over the forward end of the valve body and forced along the length of the valve body until the barb segments ride up the upward rearwardly sloped surface and then snap over the sloped surface to compress and seal the tube between the valve body and sleeve. The sleeve cannot be disengaged from the body thereby precluding breakage of the seal between the tube and body.

10 Claims, 1 Drawing Sheet

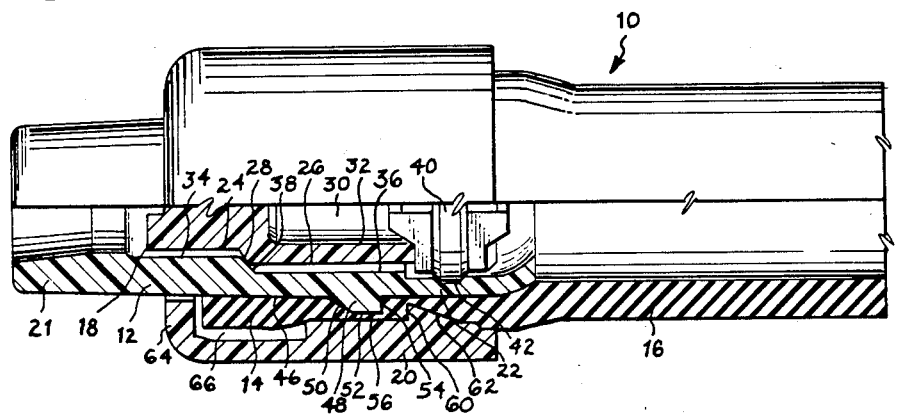
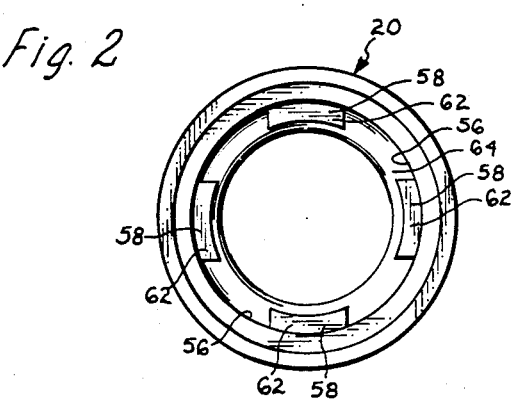

CHECK VALVE HAVING SNAP-ON CLAMPING SLEEVE

BACKGROUND OF THE INVENTION

1. Field of the Invention

This invention relates to check valves for controlling the direction of flow of a fluid within a tube. More particularly, this invention relates to check valve clamps for clamping the check valve into the opened end of a tube allowing a fluid to be forced into the tube and checked from flowing out of the tube.

2. Description of the Background Art

Presently, there exist many types of check valves designed to be inserted within the end of a tube to allow the flow of a fluid into the tube while checking or preventing the fluid from flowing out of the tube. Typical examples of such check valves are disclosed in U.S. Pat. No. 3,831,629, in U.S. Pat. No. 4,602,655, and in U.S. patent application, Ser. No. 06/867,319, filed May 23, 1986, now U.S. Pat. No. 4,681,132 the disclosure of each of which is hereby incorporated by reference herein. Each of these check valves is commonly referred to as a catheter valve and designed to be used in the proximal end of an inflation tube of a catheter, endotracheal tube, or the like.

More specifically, most catheters include an inflatable balloon or cuff at its distal end which is inflated via the inflation tube once the catheter or endotracheal tube is properly positioned within the patient's trachea, thereby securing the catheter or endotracheal tube into position. The catheter check valve, being positioned in the proximal end of the inflation tube, allows the inflatable cuff to be inflated through the use of a syringe and then, once inflated, the catheter check valve prevents the air from escaping causing deflation of the cuff. U.S. Pat. No. 4,617,015, the disclosure of which is hereby incorporated by reference herein, more particularly discloses the operation of a catheter check valve used in conjunction with an endotracheal tube.

It has always been desirable to completely and rigidly seal the catheter check valve within the end of the inflation tube to prevent air leakage therebetween even when the check valve and tube are roughly handled. In U.S. Pat. No. 3,831,629, the check valve is secured within the end of the tube by means of a frustro-conical retaining sleeve or cap. Specifically, the tube is threaded through the opening in the cap and then, after the valve is forced into the end of the tube, the cap is slid back along the tube and fitted over the end of the check valve to compress and sealingly secure the tube therebetween. In U.S. Pat. No. 4,602,655, the check valve is secured and sealed within the end of the tube by means of a flange mounting formed integrally with the body of the check valve allowing the end of the tube to be slid into position between the opened end of the flange and the valve body. After the tube is properly positioned between the flange and the valve body, the flange is annularly crimped to rigidly secure and seal the check valve into the end of the tube. Finally, another type of retaining sleeve or clamp comprises an annular sleeve having an inwardly disposed annular groove formed upon its lumen which mates with a corresponding annular protrusion extending about the outer surface of the body of the check valve. During installation, the check valve is forced into the end of the tube and then the sleeve is forced over the end of the tube containing the check valve, until the annular groove formed in the sleeve is aligned in the same plane as the annular protrusion extending from the body of the check valve. The tube positioned therebetween is thus compressed to form a rigid seal with the check valve.

All of the devices for installing a catheter check valve within the end of a tube as disclosed above have been widely accepted throughout the medical and other fields. However, the sleeve or clamp disclosed in U.S. Pat. No. 3,831,629 is difficult to implement in a production environment because the sleeve must be fitted over the tube before the check valve is inserted into the end of the tube. The integral mounting flange of the check valve disclosed in U.S. Pat. No. 4,602,655 and the removable sleeve of the latter type described above, are both adaptable to production environments for automatic assembly. However, more rigid retention of the check valve within the end of the tube is desirable. Specifically, experience has shown with the latter type of sleeve or clamp, adequate force may be imparted to the valve body during inflation via the syringe, that the annular groove of the sleeve is forced out of position in alignment with the annular protrusion of the valve body. When such occurs, it is obvious that the check valve is no longer rigidly secured within the end of the tube.

Therefore, it is an object of this invention to provide an apparatus which overcomes the aforementioned inadequacies of the prior art devices and provides an improvement which is a significant contribution to the advancement of the check valve art.

Another object of this invention is to provide means for rigidly and sealingly securing a check valve within the end of a tube.

Another object of this invention is to provide a clamping sleeve for rigidly and sealingly securing a check valve within the end of a tube which may be assembled in production quantities using conventional production line assembly equipment.

Another object of this invention is to provide a clamping sleeve which rigidly and sealingly secures a check valve within the end of a tube and is not releasable therefrom even when excessive pressure is applied to the valve body by a syringe or otherwise.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises a snap-on valve sleeve for a check valve such as a catheter check valve designed to be rigidly and sealingly secured within the end of an elastomeric tube. More particularly, the clamping sleeve of the invention comprises a plurality of inwardly disposed barb segments which are positioned in mating alignment with an annular protrusion positioned about the outer surface of the body of the valve. The annular protrusion of the body comprises an upward rearwardly sloped surface and a flat step surface perpendicularly disposed relative to the outer surface of the body of the valve.

During assembly, the rearward end of the check valve is inserted into the end of the tube allowing the outer edge of the end of the tube to slide over the step portion of the annular protrusion until the tube is positioned along a partial length of the body of the valve. The clamping sleeve is then positioned over the forward end of the valve body and forced along the length thereof until the inwardly disposed barb of the sleeve rides up the upward rearwardly sloped surface of the annular protrusion of the body and then snaps over the same to compress and seal the elastomeric tube therebetween.

It is noted that the elastomeric tube is rigidly secured about the body of the valve by means of the inwardly disposed barbs of the clamping sleeve. Specifically, as the sleeve is grasped with one hand and a syringe is fitted into the body of the check valve with another hand, it becomes readily apparent that as more force is imparted to the body of the check valve via the syringe, the more rigidly the inwardly disposed barbs engage against the flat surface of the step portion of the annular protrusion of the body to thereby more rigidly compress and secure the elastomeric tube therebetween. Indeed, it should also be readily apparent that the rearward flat surface of the annular protrusion of the valve body cannot be overridden by the inwardly disposed barbs of the sleeve. Hence, the sleeve cannot be disengaged from the body thereby precluding breakage of the seal between the elastomeric tube and the valve body.

From the foregoing, it should be appreciated that the clamping sleeve of the invention functions to rigidly and sealingly secure the check valve into the end of an elastomeric tube even when excessive force is imparted to the valve body via a syringe during use. Further, it should be appreciated that the sleeve is assembled with the valve body by first positioning the valve body in the end of the elastomeric tube and then sliding this sleeve over the end of the tube about the valve body. Hence, assembly of the clamping sleeve and valve body of the invention may be accomplished in production quantities using known production equipment.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a partial longitudinal cross-sectional view of the snap-on valve sleeve of the invention in a fully assembled position about the end of an elastomeric tube; and FIG. 2 is a rear end view of the clamping sleeve of the invention illustrating the equispaced arcuate barb segments positioned annularly about and extending from the inside surface of the sleeve.

Similar reference characters refer to similar parts throughout the several views of the drawings.

DETAILED DESCRIPTION OF THE PREFERRED EMBODIMENT

Referring to FIGS. 1 and 2, the check valve, generally indicated by numeral 10 of the invention, comprises a substantially cylindrical body 12 for insertion within the end 14 of an elastomeric tube 16. A valve element 18 is contained within the valve body 12 to allow the flow of a fluid into the tube 16 while preventing or cheoking the flow of fluid out of the tube 16. A clamping sleeve, generally indicated by numeral 20, is positioned over the forward end 21 of the body 12 and slid along the length of the body 12 to the rearward end 22 until firmly seated around the end 14 of the tube 16 about the valve body 12, as more particularly described hereinafter.

As illustrated, valve element 18 comprises a reduced diameter portion 24 and an increased diameter portion 26 formed together by a forwardly converging frustroconical seat 28. A rearwardly formed blind axial cylindrical hole 30 is formed along the increased diameter portion 26 of the valve element 18 allowing the walls 32 thereof to resiliently flex.

Corresponding to the configuration of the valve element 18, the internal cylindrical surface of the valve body 12 comprises a reduced diameter portion 34 and an increased diameter portion 36 joined together at a forwardly converging frustro-conical seat 38. An apertured retaining plug 40 is fitted into an annular groove 42 of the rearward end 22 of the valve body 12 to resiliently force the valve seat 28 of the valve element 18 forwardly in sealing engagement with the valve seat 38 of the valve body 12.

During use, a medical syringe (not shown) is fitted into the forward end 21 of the valve body 12 and forced inwardly to push the valve element 18 rearwardly until the walls 32 thereof flex, thereby disengaging the seats 28 and 38 of the valve element 18 and valve body 12. The syringe may then be operated to force air into the tube 16 for inflation of the cuff of the catheter or endotracheal tube or for other uses. Upon disengagement of the syringe from the forward end 22 of the valve body 12, the resiliency of walls 32 of the valve element 18 return to its memory position to seal the respective seats 28 and 38 together.

A more detailed description of the valve element 18 and the apertured retaining plug 40 may be found U.S. patent application, Ser. No 06/867,319, now U.S. Pat. No. 4,681,132, filed May 23, 1986, entitled "Check Valve with Preset Cracking Pressure", the disclosure which is hereby incorporated by reference herein. However, it shall be understood that the check valve 10 of the invention may comprise other types of check valves without departing from the spirit and scope of this invention. For example, the check valve 10 of the invention may comprise the check valve disclosed in U.S. Pat. No. 3,831,629 and 4,602,655, the disclosure of each of which is hereby incorporated by reference herein.

The outer surface 46 of the check valve 10 comprises a forwardly converging frustro-conical protrusion 48 which preferably extends annularly therearound. As shown in FIG. 1, protrusion 48 preferably comprises a rearward outwardly sloping surface 50, a flat longitudinal surface 52 and a flat transverse surface 54. Preferably, flat transverse surface 54 extends substantially perpendicular to the longitudinal axis of the valve body 12.

The inside surface 56 of the clamping sleeve 20 comprises a plurality of inwardly disposed barb segments 58 having a segmented forwardly converging frustro-conical configuration. Each barb segment 58 comprises a flat transverse surface 60 and a forward inwardly sloping surface 62. Preferably, as illustrated in FIG. 2, a total of four (4) barb segments 58 are positioned annularly from the inside surface 56 of the sleeve 20. However, it shall be understood that the barb segments 58 may extend completely annularly about the inside surface 56 of the sleeve 20 thereby forming a continuous barb having a non-segmented forwardly converging frustro-conical configuration.

During assembly, the rearward end 22 check valve 10 complete with its valve element 18 and retaining plug 40 positioned therein, is inserted into the end 14 of the tube 16 until the end 14 of the tube 16 extends appreciably forward of the annular protrusion 48. Once properly positioned in this manner, the clamping sleeve 20 is positioned concentrically over the forward end 21 of the valve body 12 and then forced rearwardly until the sloping surface 62 of each of the barb segments 58 mates with the sloping surface 50 of the annular protrusion 48 with the elastomeric tube 16 positioned therebetween. With further force applied to the sleeve 20, the sloping surface 62 of each of the barb segments 58 rides and snaps over the sloping surface 50 and flat longitudinal surface 52 of the annular protrusion 48. In this snapped-on position, the elastomeric tube 16 is rigidly and sealingly engaged between the flat transverse surface 60 of the barb segments 58 and the flat transverse surface 54 of the annular protrusion 48. Indeed, if excessive force is applied to the check valve 10 via the syringe or otherwise, it is clear that the elastomeric tube 16 positioned between the protrusion 48 of the valve body and the barb segments 58 of the sleeve 20 will simply become more rigidly and sealingly secured.

It is noted that the forward end 64 of the clamping sleeve 20 is preferably turned inwardly to provide an esthetic appearance upon assembly and to act as a stop against the end 14 of the tube 16 to prevent the clamping sleeve 20 from being pushed further along the length of the tube 16 until it is completely disengaged from the valve body 12. It is further noted that the forward portion of the clamping sleeve 20 comprises an increased diameter portion 66 to provide room for expansion for the end 14 of the tube 16 upon compression of the material between the annular protrusion 48 of the valve body 12 and the clamping sleeve 20. Finally, it is noted that the valve body 12 is preferably manufactured from a material such as polypropylene and the clamping sleeve 20 manufactured from a material such as Lexan, such that neither the valve body 12 nor the clamping sleeve 20 is fractured or otherwise permanently deformed as the clamping sleeve 20 is snapped into position about the valve body 12 as hereinabove described.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described,
What is claimed is:

1. A check valve for connection to the end of an elastomeric tube, comprising in combination:
   a body including a forward end, a rearward end for insertion within the end of the tube, and a forwardly converging frustro-conical protrusion extending fully and continuously annularly around said rearward end of said body and having a rearward outwardly sloping surface and a transverse surface;
   a valve element positioned within said body to control the flow of a fluid therethrough;
   a clamping sleeve including an inwardly turned forward end to locate the end of the tube within said sleeve, a rearward end, and a forwardly converging frustro-conical barb extending at least partially annularly around said rearward end of said sleeve and having a forward inwardly sloping surface and a transverse surface whereby, upon positioning of said sleeve over said forward end of said body and sliding said sleeve rearwardly over the end of the tube, said forward inwardly sloping surface of said sleeve engages over said rearward outwardly sloping surface of said body until said transverse surfaces are in facing relationship with each other with the tube positioned therebetween while said inwardly turned forward end prevents said sleeve from disengaging said body by further rearward sliding of said sleeve along the tube, thereby rigidly and sealingly securing said body within the end of the tube;
   said forward end of said sleeve further including an increased diameter portion whereby expansion room is provided between said body and said sleeve for the expansion of the end of the tube upon the compression of the tube between said portrusion and said barb;
   said transverse surface of said protrusion extending perpendicularly from the longitudinal axis of said body;
   said transverse surface of said barb extending perpendicularly from the longitudinal axis of said sleeve; and
   including a flat longitudinal surface positioned between said rearward outwardly surface and said transverse surface of said protrusion.

2. The valve as set forth in claim 1, wherein said body and said valve element comprise a catheter valve.

3. The valve as set forth in claim 2, wherein said body and said sleeve are each integrally formed.

4. The valve as set forth in claim 3, wherein said body and said sleeve are each formed of a nonfracturable material allowing said protrusion to snap over said barb without fracturing or permanently deforming said protrusion or said barb.

5. A fitting for connection to the end of an elastomeric tube, comprising in combination:

a body including a forward end, a rearward end for insertion within the end of the tube, and a forwardly converging frustro-conical protrusion extending at least partially annularly around said rearward end of said body and having a rearward outwardly sloping surface and a transverse surface;

an integral, one-piece clamping sleeve including a forward end being turned inwardly to locate the end of the tube within said sleeve thereby preventing said sleeve from disengaging said body by sliding said sleeve rearwardly along the tube, a rearward end, and a forwardly converging frustro-conical barb extending at least partially annularly around said rearward end of said sleeve and having a forward inwardly sloping surface and a transverse surface whereby, upon positioning of said sleeve over said forward end of said body and sliding said sleeve rearwardly over the end of the tube, said forward inwardly sloping surface of said sleeve engages over said rearward outwardly sloping surface of said body until said transverse surfaces are in facing relationship with each other with the tube positioned therebetween while said inwardly turned forward end prevents said sleeve from disengaging said body by further rearward sliding of said sleeve along the tube, thereby rigidly and sealingly securing said body within the end of the tube.

6. The valve as set forth in claim 5, wherein said protrusion extends fully and continuously annularly around said rearward end of said body.

7. The valve as set forth in claim 6, wherein said forward end of said sleeve further includes an increased diameter portion whereby expansion room is provided between said body and said sleeve for the expansion of the end of the tube upon the compression of the tube between said protrusion and said barb.

8. The valve as set forth in claim 7, wherein said transverse surface of said protrusion extends perpendicularly from the longitudinal axis of said body.

9. The valve as set forth in claim 8, wherein said transverse surface of said barb extends perpendicularly from the longitudinal axis of said sleeve.

10. The valve as set forth in claim 9, wherein said protrusion further includes a flat longitudinal surface positioned between said rearward outwardly surface and said transverse surface of said protrusion.

* * * * *